United States Patent [19]

Russell et al.

[11] Patent Number: 5,761,243
[45] Date of Patent: Jun. 2, 1998

[54] DIGITAL RECEIVER WITH NOISE FILTER WHICH ALSO SERVES AS A FEEDBACK FILTER PROVIDING INTERSYMBOL INTERFERENCE REDUCTION

[75] Inventors: Mark A. Russell, Atlanta, Ga.; Robert J. Sluijter; Johannes W. M. Bergmans, both of Eindhoven, Netherlands

[73] Assignee: U.S. Philips Corporation, New York, N.Y.

[21] Appl. No.: 642,803

[22] Filed: May 3, 1996

Related U.S. Application Data

[63] Continuation of Ser. No. 306,032, Sep. 19, 1994, abandoned.

[30] Foreign Application Priority Data

Sep. 16, 1993 [BE] Belgium ............... 09300970

[51] Int. Cl.$^6$ ............................................. H04L 27/01
[52] U.S. Cl. ........................ 375/233; 375/348; 375/349
[58] Field of Search .................................. 375/229, 232, 375/233, 348, 349; 364/724.2; 455/306

[56] References Cited

U.S. PATENT DOCUMENTS

| | | | |
|---|---|---|---|
| 4,213,095 | 7/1980 | Falconer | 375/232 |
| 4,864,590 | 9/1989 | Arnon et al. | 375/232 |
| 4,912,725 | 3/1990 | Hulth | 375/233 |
| 5,327,460 | 7/1994 | Batruni | 375/233 |

OTHER PUBLICATIONS

Carlos A. Belfiore et al., "Decision Feedback Equalization", Proceedings of the IEEE, vol. 67, No. 8, Aug. 1979, pp. 1143–1157.

*Primary Examiner*—Stephen Chin
*Assistant Examiner*—Jeffrey W. Gluck
*Attorney, Agent, or Firm*—Edward W. Goodman

[57] ABSTRACT

A receiver for transmitted signals which represent digital symbol values includes a low-pass filter to minimize transmission noise by reducing the receiver bandwidth. However, this creates pulse distortion which can cause intersymbol interference when the filtered signal is supplied to a symbol detector. Such interference is minimized by the inclusion of a feedback loop between the output of the symbol detector and the input to the filter, in which a detected symbol is multiplied by correction factor and supplied to a subtractor where it is subtracted from the signal to be filtered. The result of the subtraction is supplied to the filter. The noise reduction filter is thus also used for matching the intersymbol distortion characteristic of a filtered detected symbol to the intersymbol distortion characteristic of a filtered received signal pulse.

5 Claims, 3 Drawing Sheets

DIGITAL RECEIVER WITH NOISE FILTER WHICH ALSO SERVES AS A FEEDBACK FILTER PROVIDING INTERSYMBOL INTERFERENCE REDUCTION

This is a continuation of application Ser. No. 08/306,032, filed Sep. 14, 1994, abandoned.

BACKGROUND OF THE INVENTION

The invention relates to a transmission system which comprises a transmitter for supplying a signal representing digital symbols to a channel and a receiver for receiving an output signal from the channel. The receiver comprises means for deriving a detection signal from a combination of an auxiliary signal derived from the received signal and a feedback signal, a symbol detector for detecting symbol values from the detection signal, and feedback means for deriving the feedback signal from the detected symbol values.

The invention likewise relates to a receiver for such a system.

A system as defined in the opening paragraph is known from U.S. Pat. No. 4,864,590.

Transmission systems of this type may be used, for example, for digital symbol transfer through the public telephone network or for reconstituting digital symbols coming from a magnetic tape or disc.

When digital symbols are transmitted via a transmission medium or stored on a recording medium respectively, the symbols to be transmitted or recorded are converted to a signal representing the digital symbols. This generally happens in the form of analog pulses which are successively applied to the transmission medium or recording medium respectively, further to be referenced by the term of channel. On the output of the channel analog pulses are present from which the value of the transmitted symbols can be determined by means of a detector. The detector may comprise a simple comparator, but it is likewise conceivable that the detector is arranged as an MLSE (Maximum Likelihood Sequence Estimation) detector. An example of an MLSE detector is a Viterbi detector.

In addition to the (desired) analog pulses, there is nearly always an (undesired) noise signal present on the output of the channel. Due to the presence of this noise signal, the detector will occasionally make erroneous decisions about the value of the transmitted symbols. The probability of erroneous decisions increases as the power of the noise signal increases. Some channels have a larger bandwidth than is necessary for transmitting the analog pulses and, besides, have a spectral power density of the noise signal that increases with frequency. The ratio of the actual bandwidth of the channel to the bandwidth necessary for transmitting the analog pulses is referenced the excess bandwidth. In such channels the signal-to-noise ratio of the output signal of the channel is lower as the excess bandwidth is higher. With a high excess bandwidth the transmission system will generally present a relatively high probability of erroneous decisions due to the relatively low signal-to-noise ratio.

To reduce this probability of erroneous decisions, the receiver of the transmission system of said United States Patent reduces the power of the noise signal at the input of the detector by means of a low-pass filter. Such a filter has a limited bandwidth, which causes the received pulses to overlap and in many cases will cause the detector input signal to not only depend on a single data symbol at a given instant but also on symbols adjacent in time. This effect is called intersymbol interference. The presence of intersymbol interference will in many cases lead to an enhancement of the symbol error rate.

To reduce the intersymbol interference caused by the low-pass filter, a decision feedback intersymbol interference canceller having two equalizing filters F1 and F2 is used in the transmission system known from said United States Patent. In this canceller a compensation signal is generated from detected symbol values by means of the feedback means. This compensation signal is subtracted from the auxiliary signal at the output of the low-pass filter. The compensation signal is an estimate of the trailing intersymbol interference caused by the low-pass filter. The impulse response of the feedback means is selected such that the output signal produced thereby is equal to the trailing intersymbol interference caused by the low-pass filter.

The prior art transmission system thus requires two additional filters besides the low-pass filter to reduce the erroneous decision probability so that the complexity of the transmission system is thus increased.

SUMMARY OF THE INVENTION

It is an object of the invention to provide a transmission system as defined in the opening paragraph, but of reduced complexity.

For this purpose, the invention is characterized in that the means for deriving the detection signal comprise a predetection filter for deriving the detection signal from the combination of the auxiliary signal and the feedback signal.

By including a predetection detector directly upstream of the filter, the function of the low-pass filter and a considerable part of the function of the feedback means may be realized with a single filter i.e. the predetection filter.

To fully compensate for the intersymbol interference introduced by the low-pass filter in the prior-art transmission system, the impulse response of the feedback filter F2 must be equal to the trailing part of the impulse response of the low-pass filter. This requires filters which are accurately alike, which in analog filters is hard to realize. An additional advantage of the transmission system according to the invention is that these requirements of likeness may be dropped, because the functions of the low-pass filter and the feedback filter are carried out by a single filter.

In the journal article "Decision Feedback Equalisation" by C. A. Belfiore and J. H. Park in Proceedings of the IEEE, vol. 67, no. 8, August 1979, an alternative transmission system is describe, in which a difference between the detection signal symbol detector output signal, which difference has been produced by a feedback filter, is subtracted from the detection signal. This method may be considered a subtraction of an estimable portion of the noise signal at the output of the channel from the detection signal before the detection signal is applied to the detector. Such an arrangement also needs only a single filter. However, a disadvantage of this transmission system is that it cannot be realised under all circumstances, as is discussed in said journal article. In addition, it is necessary that for determining the difference between the detection signal and the detector output signal the two signals have undergone an equally long delay. In an analog implementation of the receiver this is hard to realize, so that the use of an analog feedback filter in the alternative transmission system is less attractive.

An embodiment of the invention is characterized in that the feedback means comprise a feedback filter.

By including another feedback filter in the feedback means it is possible to compensate not only for the intersymbol interference caused by the reduction of the noise signal power, but also the intersymbol interference caused by a limited bandwidth of the channel or by filtering in the transmitter of the transmitted pulses.

A further embodiment of the invention is characterized in that the feedback means are arranged for producing at least two feedback signals, in that the determining means for determining the detection signal comprise at least two parallel branches each of the branches being arranged for combining the auxiliary signal with one of the feedback signals, in that each of the branches comprises a sub-predetection filter for filtering the combination of the auxiliary signal and the feedback signal concerned, and in that the determining means for determining the detection signal comprise combining means for combining the output signals of the branches to the detection signal.

By arranging the predetection filter as at least two sub-predetection filters whose output signals are combined, and by forming each of the input signals of the sub-predetection filters from the auxiliary signal and its own feedback signal, a simple implementation is obtained for predetection filters having a transfer function of an order higher than 1.

BRIEF DESCRIPTION OF THE DRAWINGS

The invention will now be further explained with reference to the drawings in which.

DESCRIPTION OF THE PREFERRED EMBODIMENTS

Figure 1:
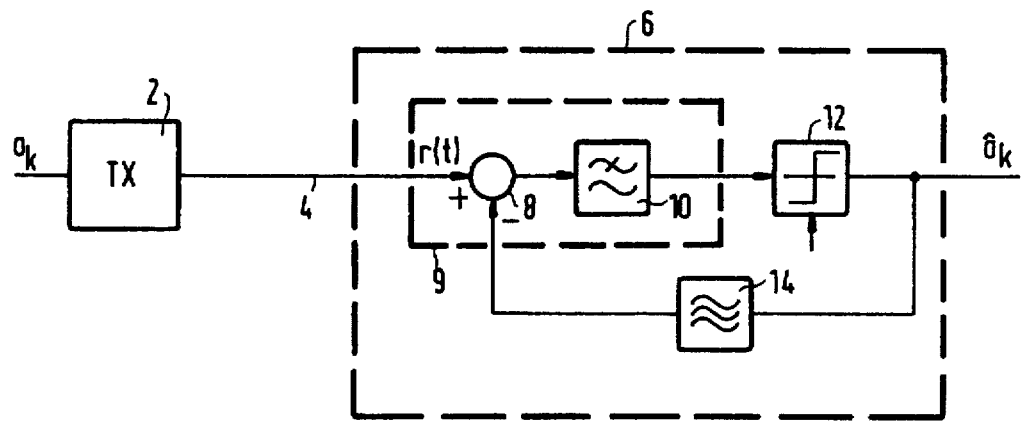
FIG. 1 shows an embodiment of a transmission system according to the invention.

In the transmission system shown in FIG. 1 the transmit symbol values $a_k$ are supplied to a transmitter 2. An output of the transmitter 2 is coupled to an input of a channel 4. An output of the channel 4 is connected to an input of a receiver 6.

The input of the receiver 6 is connected to a first input of determining means 9 for deriving a detection signal. An output of the determining means 9 is connected to an input of the symbol detector 12. The output of the detector symbol 12 forms the output of the receiver 6 and is also connected to an input of feedback means which in this case comprise a feedback filter 14. The output of the feedback filter 14 is a feedback signal which is supplied to a second input of the determining means which derives the detection signal.

The first input of the deriving means for determining the detection signal is formed by a first input of the subtracter circuit 8, the second input of the determining means being a second input of the subtracter circuit 8. The output of the subtracter circuit 8 is connected to an input of the predetection filter 10. The output of the predetection filter 10 forms detection signal at the output of the determining means 9.

In the transmitter 2 the presented symbol values $a_k$ are converted into pulses suitable for conveyance through the channel 4. They may be, for example, so-termed full response pulses in which case each symbol $a_k$ is represented by a single pulse, but it is alternatively conceivable that so-termed partial response pulses are used in which case each symbol $a_k$ is represented by more than one pulse.

The subtracter circuit 8 subtracts the feedback signal coming from the feedback filter 14 from the received signal r(t). The predetection filter 10 derives the detection signal from the output signal of the subtracter circuit 8. The transfer function of the predetection filter is selected to be such that the series of instantaneous values of the noise component at the input of the detector 12 at the decision instants of detector 12 is a white noise signal, whereas the transfer characteristic of the feedback filter 14 is determined by the intersymbol interference introduced by the channel 4. The dimensioning of the predetection filter 10 and the feedback filter 14 will be further discussed in embodiments of the invention to be explained hereinafter.

Figure 2:
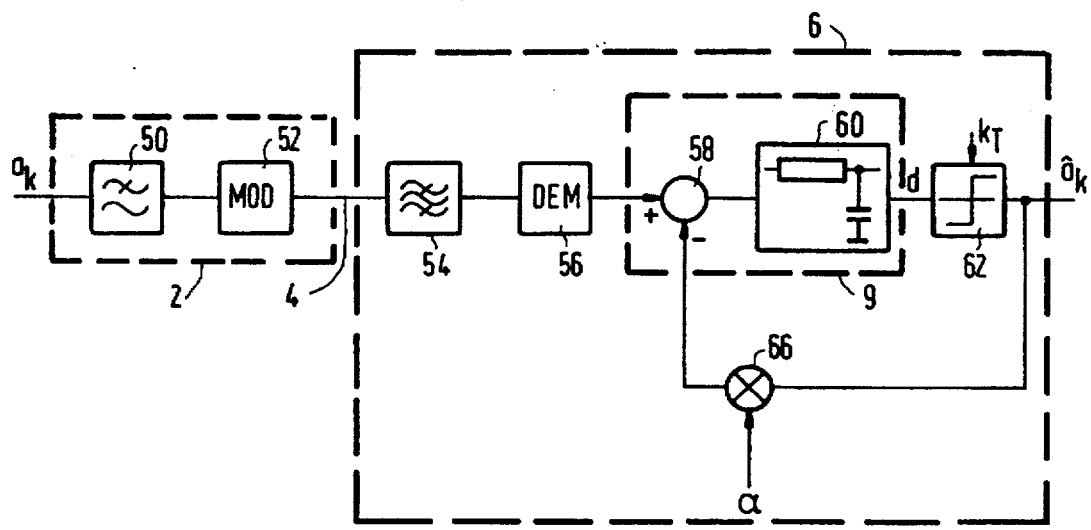
FIG. 2 shows another embodiment of a transmission system according to the invention.

In the transmission system shown in FIG. 2 the transmit symbol values $a_k$ are supplied as NRZ pulses to an input of a send filter 50. The output of the send filter 50 is connected to an input of an FM modulator 52. The output of the FM modulator 52 also forms the output of the transmitter 2 and is connected to the input of the channel 4. The output of the channel 4 is connected to an input of the receiver 6.

In the receiver 6 the input signal of the receiver is applied to a bandpass filter 54. The output of the bandpass filter 54 is connected to the input of an FM demodulator 56. The output of the FM demodulator 56 is connected to a first input of a subtracter circuit 58. The output of the subtracter circuit 58 is connected to a first input of the predetection filter in this case being an analog first-order low-pass filter 60. The output of the low-pass filter 60 is connected to an input of a symbol detector 62. The deriving means for determining the detection signal are formed by the subtracter circuit 58 and the low-pass filter 60. The output symbol detector is connected to a first input of a multiplier circuit 66. A second input of the multiplier circuit 66 is supplied with a constant value α. The output of the multiplier circuit 66 is connected to a second input of the subtracter circuit 58. The feedback means are formed here by the multiplier circuit 66.

In the transmitter 2 the NRZ pulses representing the symbol values $a_k$ are filtered by the send filter 50. This filter is a $5^{th}$ order Bessel filter having a cut-off frequency equal to half the symbol frequency. This filter limits the bandwidth of the transmit signal. In the FM modulator 52 the output signal of the send filter 50 is modulated on a carrier by means of frequency modulation. The frequency modulation of the FM signal is equal to $0.35 \cdot f_s$, where $f_s$ is the symbol frequency, which leads to a modulation index η of 0.5. The send filter has by approximation a Gaussian transfer function, so that the transmitted signal is a GMSK (Gaussian Minimum Shift Keying) signal by approximation.

In the receiver 6 the received signal is filtered by the bandpass filter 54.

This bandpass filter has a bandwidth of $1.8 \cdot f_s$ and has a transfer characteristic obtained by low-pass/bandpass transformation of a $5^{th}$ order Bessel filter. The FM signal is demodulated by the FM demodulator 56 after which the difference between the output signal of the FM demodulator 56 and the feedback signal is filtered by the low-pass filter 60. The low-pass filter 60 has a cut-off frequency of $0.05 \cdot f_r$. On the output of the filter 60 the detection signal is available. As the output signal of the FM demodulator 56 contains a noise component having a power spectrum quadratically increasing with frequency (up to a certain maximum frequency), and the low-pass filter 60 has a power transfer function which, above the cut-off frequency, quadratically decreases with frequency, a detection signal having a substantially white noise component is obtained at the input of the detector 62 (also up to a certain maximum frequency).

Figure 3:
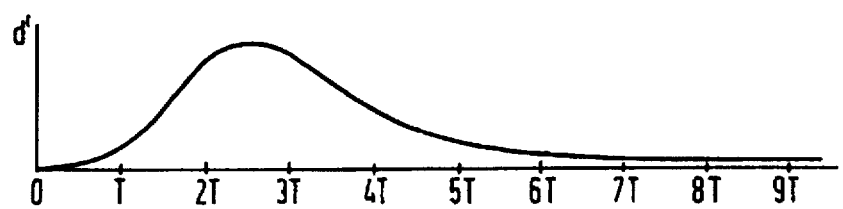
FIG. 3 shows the contribution of a single received pulse to a detection signal.
Figure 4:
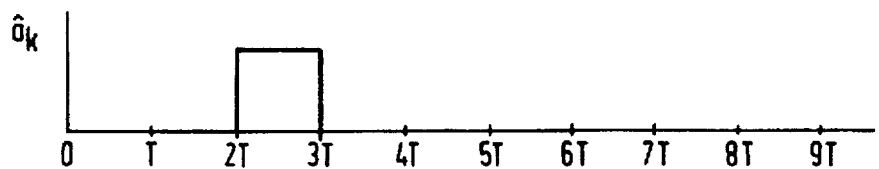
FIG. 4 shows an output signal of a detector caused by the pulse of FIG. 3.
Figure 5:
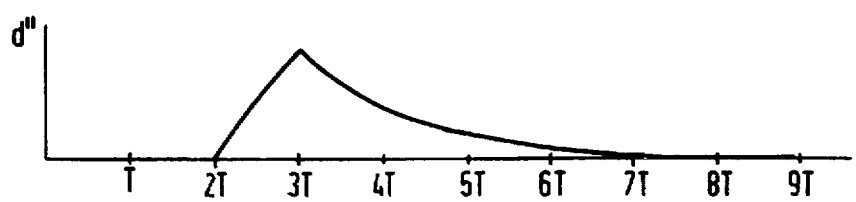
FIG. 5 shows the contribution of an output signal of a detector to an output signal of a low pass filter.
Figure 6:
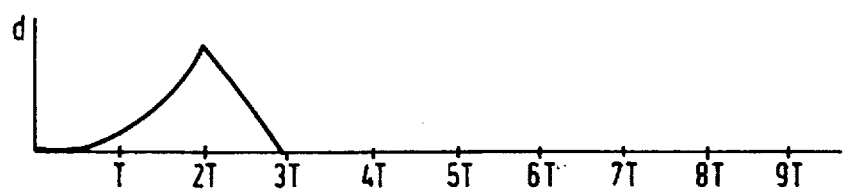
FIG. 6 shows an actual detection signal at an input of a detector.

FIG. 3 shows plotted against time the contribution of a single received pulse at the input of the receiver to the detection signal. It is clearly visible from this curve that the low-pass filter 60 introduces a considerable quantity of intersymbol interference. The symbol detector 62 makes decisions at instants k.T about the symbol values received at these instants. This symbol value is retained at the output of symbol detector 62 for a period of time T. The output signal symbol detector 62 caused by the pulse shown in FIG. 3 is shown in FIG. 4. This output signal is also fed back to the low-pass filter 60 via the multiplier circuit 66 and the subtracter circuit 58. The contribution of that signal to the output signal of the low-pass filter 60 is shown in FIG. 5. The final detection signal will be equal to the difference between the signals shown in FIG. 3 and FIG. 5. This detection signal is shown in FIG. 6. The value of $\alpha$ is to be selected such that the signals shown in FIGS. 3 and 5 match each other for instants $t \geq 3$ T and so by subtraction cancel out at such instants. This cancellation is possible because the pulse shown in FIG. 3 for instants $t \geq 3$ T can be approximated as an exponential function of time. Since as seen in FIG. 5 the contribution of the output signal of the symbol detector to the detection signal from $t \geq 3$ T result in a similar, but time shifted, exponential function, an exact scaling by $\alpha$ may provide that the values of the two exponential functions are made equal for $t \geq 3$ T. As a result, an ideal compensation is possible for the intersymbol interference introduced by the low-pass filter. For thus compensating for the intersymbol interference caused by channel 4 and the low-pass filter 60, the following should generally hold:

$$(h*w)(t)-(g*w)(t-mT)=0 \quad t \geq mT \tag{1}$$

Herein h is the impulse response of the channel, w the impulse response of the predetection filter, g the impulse response of the feedback means, T the symbol period, * the convolution operator and m the number of samples of the impulse response of the channel utilized for the detection of the symbol value $\hat{a}_k$. If the channel impulse response may be approximated by $\delta(t)$, (1) changes into:

$$w(t)-(g*w)(t-mT)=0 \quad t \geq mT \tag{2}$$

If w(t) is an exponential function $c \cdot e^{-t/\tau} \cdot U(t)$, and g(t) is causal, (2) changes into:

$$ce^{-\frac{t}{\tau}} - c \int_{-0}^{t-mT} g(\theta) e^{\frac{t-mT-\theta}{\tau}} d\theta = o \quad t \geq mT \tag{3}$$

(3) may be elaborated into:

$$\int_{-0}^{t-mT} g(\theta) e^{\frac{\theta}{\tau}} d\theta = e^{-\frac{mT}{\tau}} \tag{4}$$

From (4) can be noticed that the solution $g(t)=e^{-mT/\tau} \cdot \delta(t)$ satisfies (4). This means that the constant factor $\alpha$ in the feedback means 66 is to be equal to $e^{-m \cdot T/\tau}$. If the detector 62 is a comparator the value of m will be equal to 1, but if a Viterbi detector is used, m may advantageously be selected to be greater than 1 because the Viterbi detector can then utilize part of the energy in the trailing part of the impulse response of the low-pass filter 60.

Figure 7:
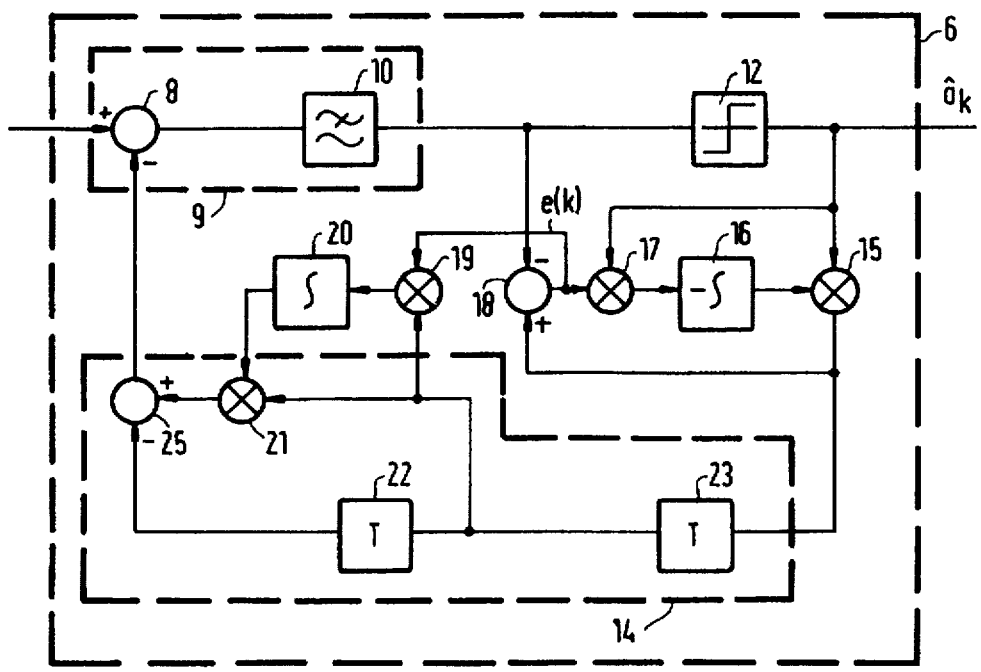
FIG. 7 shows an embodiment of a receiver arranged for the reception of class IV partial response signals.

In the receiver 6 shown in FIG. 7 the input signal is applied to the determining means 9 for determining the detection signal. The output of the determining means 9 for determining the detection signal is connected to an input of the detector 12 and to a first input of a subtracter circuit 18. The output of the detector 12 forms the output of the receiver and is also connected to an input of a multiplier circuit 17 and to an input of another multiplier circuit 15. The output of multiplier circuit 15 is connected to a second input of the subtracter circuit 18 and to an input of a delay element 23 which has a delay T. The output of the delay element 23 is connected to a first input of a multiplier circuit 19, a first input of a multiplier circuit 21 and an input of a delay element 22. The output of the delay element 22 is connected to the first input of a subtracter circuit 25. The output of the subtracter circuit 25 is connected to a second input of the determining means 9 for determining the detection signal. The feedback means are formed by the delay elements 22 and 23 and by the multiplier circuit 21 and the subtracter circuit 25.

The output of the subtracter circuit 18 is connected to a second input of the multiplier circuit 17 and to a second input of the multiplier circuit 19. The output of the multiplier circuit 17 is connected to an input of an inverting integrator 16 whose output is connected to a second input of the multiplier circuit 15.

The output of the multiplier circuit 19 is connected to an input of an integrator 20. The output of the integrator 20 is connected to a second input of the multiplier circuit 21. The output of the multiplier circuit 21 is connected to a second input of the subtracter circuit 25.

The receiver shown in FIG. 7 is arranged for a channel which has a so-termed class-IV partial response q(k) transfer. For the discrete-time impulse response of this channel there may be written for a sampling period equal to the symbol interval $q(k)=\delta(k)-\delta(k-2)$, where $\delta(k)$ is the discrete time delta function. Assuming that the noise component in the input signal of the receiver quadratically increases with frequency, which is often the case in magnetic recording channels, a first-order low-pass filter may be selected for the predetection filter 10 so as to obtain a detection signal whose available noise component is white.

For the discrete-time impulse response of the predetection filter 10 the following holds then:

$$w(k)=(1-\alpha)^k \cdot U(k) \tag{5}$$

In (5) $\alpha$ is a measure for the time constant of the low-pass filter and u(k) is the unit step function which is equal to 0 for $k<0$ and equal to 1 for $k>0$. For the discrete-time impulse response q'(k) of the combination of channel and predetection filter there is then found:

$$q'(k)=(1-\alpha)^k \cdot U(k)-(1-\alpha)^{k-2} \cdot U(k-2) \tag{6}$$

From the impulse response of (6) all the values for $k>0$ are to be eliminated by the combination of the feedback filter 14 and the predetection filter 10. The impulse response of the combination of the feedback filter 14 and the predetection filter 10 is then to be equal to:

$$h'(k)=(1-\alpha)^k \cdot U(k-1)-(1-\alpha)^{k-2} \cdot U(k-2) \tag{7}$$

(7) may also be written as:

$$h'(k)=(1-\alpha)\cdot(1-\alpha)^{k-1}\cdot U(k-1)-(1-\alpha)^{k-2}\cdot U(k-2) \quad (8)$$

(8) may be considered the response of the predetection filter 10 to a signal equal to:

$$f(k)=(1-\alpha)\cdot\delta(k-1)-\delta(k-2) \quad (9)$$

This means that the discrete-time impulse response h(k) of the feedback filter is to be equal to $(1-\alpha)-\delta(k-1)-\delta(k-2)$.

If the predetection filter 10 is arranged as a discrete-time filter and also the amplitude of the input signal of the subtracter circuit 8 is known accurately (for example, by applying an AGC amplifier), the coefficient of the multiplier circuit 21 may simply be selected equal to $1-\alpha$. If the predetection filter 10 is arranged as an analog filter, or if the amplitude of the input signal of the subtracter circuit 8 is not known accurately, the constant $\alpha$ is not known accurately either. In that case it is desirable to arrange the feedback filter as an adaptive filter which determines the correct value of the multiplying coefficient from the detection signal and the detected symbols. In the receiver 6 shown in FIG. 7 the feedback filter is arranged as an adaptive version. In addition, the receiver comprises an adaptive system to have the receiver operate correctly with different amplitudes of the detection signal.

There is assumed that on the input of the delay element 23 a reconstructed detection signal is present representing the detected symbol values and having an amplitude equal to the amplitude of the detection signal. On the output of the subtracter circuit 18 there is a signal present which is proportional to the difference between the reconstructed detection signal and the present detection signal. By means of multiplier circuit 19 the correlation is determined between the difference signal e(k) and the value of the reconstructed detection signal. If the coefficient $(1-\alpha)$ has a correct value, the correlation value between the difference signal e(k) and the reconstructed detection signal will be equal to zero. The output signal of the integrator 20 which represents the value of $(1-\alpha)$ continues to keep its actual value. If the value of $(1-\alpha)$ is too small, the intersymbol interference introduced by the predetection filter 10 is then compensated for only in part by the feedback signal. There is then a correlation between the difference signal e(k) and the reconstructed detection signal â'(k−1). The output signal of the multiplier circuit 19 is a measure for this correlation. With too small a value of (1−a) the output signal of the multiplier circuit 19 will be positive on average. As a result, the output signal of the integrator will increase until the correlation value between e(k) and the reconstructed detection signal is equal to zero.

If the value of $(1-\alpha)$ is too large, the intersymbol interference introduced by the predetection filter is overcompensated by the feedback filter. There is then also a correlation between the difference signal e(k) and the reconstructed detection signal. With too large a value of $(1-\alpha)$ the output signal of the multiplier circuit 19 will be negative on average. As a result, the output signal of the integrator will diminish until the correlation value between e(k) and the reconstructed detection signal is equal to zero.

With the aid of the multiplier circuit 15 a reconstructed detection signal is formed from the detected symbols $â_k$ and the output signal of the inverting integrator 16. In the ideal situation the amplitude of the reconstructed detection signal is equal to the amplitude of the actual detection signal. By means of the subtracter circuit 18 the difference is found between the reconstructed detection signal and the actual detection signal. By means of the multiplier circuit 17 the difference signal e(k) is multiplied by the detection signal, so that an error signal is available on the output of the multiplier circuit, which signal is a measure for the difference between the amplitude of the reconstructed detection signal and the actual detection signal, irrespective of the sign of the detection signal. If the amplitude of the reconstructed detection signal is too large, the output signal of the multiplier circuit 17 is positive. As a result, the output signal of the inverting integrator 16 will diminish until the average value of the error signal is equal to zero. If the amplitude of the reconstructed detection signal is too small, the output signal of the multiplier circuit 17 is negative. As a result, the output signal of the inverting integrator 16 will increase until the average value of the error signal is equal to zero. There should be observed that it is alternatively possible to use an AGC control in lieu of the control carried out by the subtracter circuit 18, the multiplier circuit 17, the integrator 16 and the multiplier circuit 15. The amplitude of the input signal of the subtracter circuit 8 is then controlled to a desired value.

Figure 8:
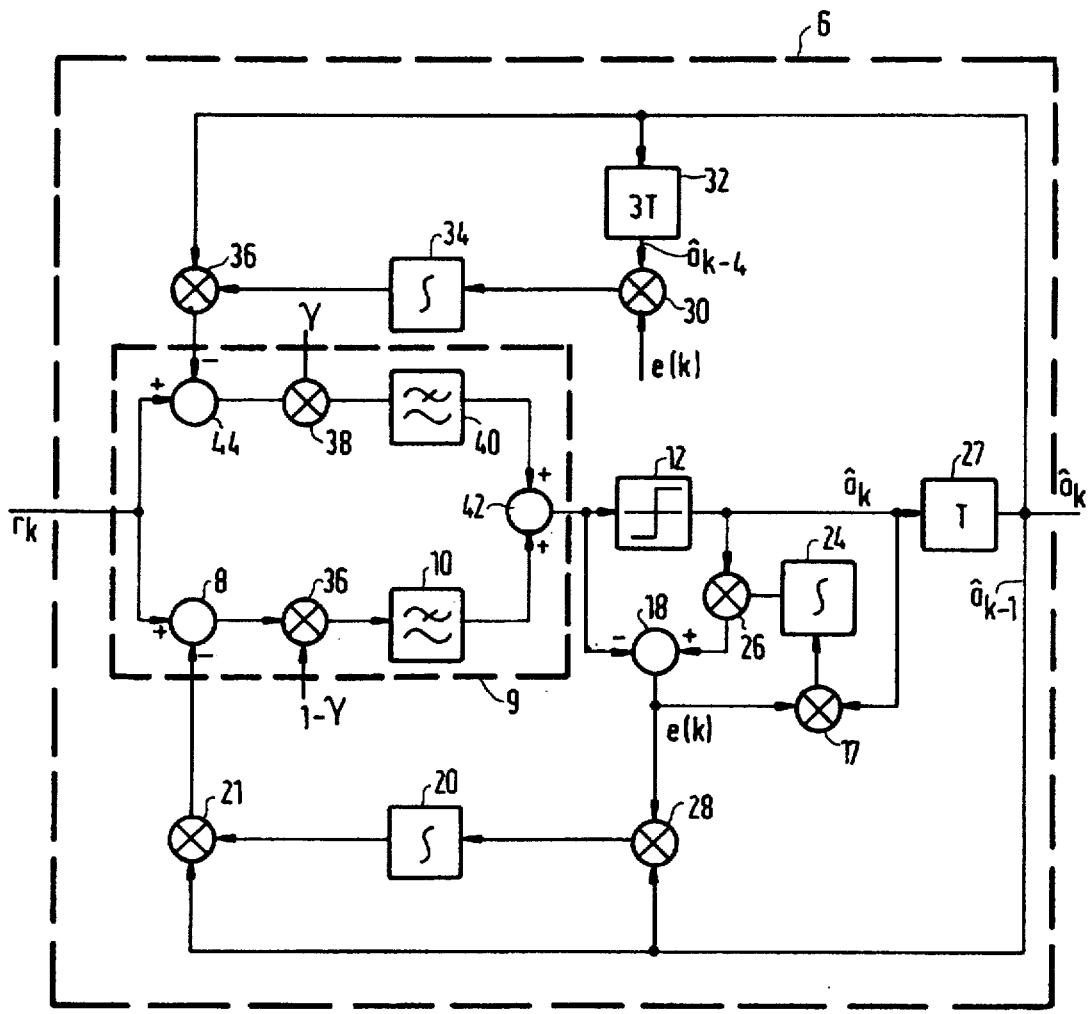
FIG. 8 shows an embodiment of a receiver arranged for the reception of bi-polar signals.

In the receiver shown in FIG. 8 the input signal of the receiver 6 is applied to a first input of a subtracter circuit 8 and to a first input of a subtracter circuit 44. The output of the subtracter circuit 44 is connected to a first input of a multiplier circuit 38. A second input of the multiplier circuit 38 is supplied with a constant $\gamma$ which is less than 1. The output of the multiplier circuit 38 is connected to a first sub-predetection filter 40. The output of the first sub-predetection filter 40 is connected to a first input of an adder circuit 42. The output of the subtracter circuit 8 is connected to a first input of a multiplier circuit 36. A second input of the multiplier circuit 36 is supplied with a complementary constant $1-\gamma$. The output of the multiplier circuit 36 is connected to a second sub-predetection filter 10. The output of the second sub-predetection filter 10 is connected to a second input of the adder circuit 42. The determining means 9 for determining the detection signal are formed in this case by the subtracter circuits 8 and 44, the multiplier circuits 36 and 38, the sub-predetection filters 10 and 40 and the adder circuit 42.

The output of the adder circuit 42 is connected to an input of the detector 12 and to a first input of the subtracter circuit 18. The output of the detector 12 is connected to a first input of a multiplier circuit 17, a first input of a multiplier circuit 26, an input of a delay element 27 and to the output of the receiver 6. The output of the delay element 27 is connected to an input of a delay element 32, to an input of a multiplier circuit 36, an input of a multiplier circuit 28 and to an input of a multiplier circuit 21.

The output of the multiplier circuit 36 is connected to a second input of the subtracter circuit 44. The output of the multiplier circuit 21 is connected to a second input of the subtracter circuit 8. The output of the multiplier circuit 26 is connected to a second input of the subtracter circuit 18. The output of the subtracter circuit 18, carrying e(k) for its output signal, is connected to a second input of the multiplier circuit 17 and to a second input of the multiplier circuit 28. The output of the multiplier circuit 17 is connected to an input of an inverting integrator 24. The output of the inverting integrator 24 is connected to a second input of the multiplier circuit 26.

The output of the multiplier circuit 28 is connected to an input of an integrator 20. The output of the integrator 20 is connected to a second input of the multiplier circuit 21.

The receiver shown in FIG. 8 is arranged to receive a channel having a so-termed bipolar transfer. For the discrete-time impulse response q(k) of this channel, there may be written for a sampling period equal to the symbol interval: $q(k)=\delta(k)-\delta(k-1)$, where $\delta(k)$ is the discrete time delta function. If the predetection filter has a second-order low-pas characteristic, the following may be written for the discrete-time impulse response of the predetection filter:

$$w(k)=\gamma(1-\alpha)^k+(1-\gamma)(1-\beta)^k \qquad (10)$$

In (10) $\alpha$ and $\beta$ are measures for the two time constants of the second-order low-pass filter and $\gamma$ is a constant greater than 0 and smaller than 1. For the discrete-time impulse response of the combination of the channel and the predetection filter, the following is then found:

$$q''(k)=\{\gamma(1-\alpha)^k+(1-\gamma)(1-\beta)^k\}\cdot U(k)-\{\gamma(1-\alpha)^{k-1}+(1-\gamma)(1-\beta)^{k-1}\}\cdot U(k-1) \qquad (11)$$

From the impulse response according to (11), all the values for k>0 are to be eliminated by the combination of the feedback means and the predetection filter. The impulse response of this combination is then to be equal to:

$$h''(k)=\{\gamma(1-\alpha)^k+(1-\gamma)(1-\beta)^k-\gamma(1-\alpha)^{k-1}-(1-\gamma)(1-\beta)^{k-1}\}\cdot U(k-1) \qquad (12)$$

(12) may also be written as:

$$h''(k)=-\gamma\alpha(1-\alpha)^{k-1}\cdot U(k-1)-(1-\gamma)\cdot\beta(1-\beta)^{k-1}\cdot U(k-1) \qquad (13)$$

If the second-order low-pass filter is realized by a parallel circuit of a first low-pass filter having a time constant determined by $\alpha$ and a second low-pass filter having a time constant determined by $\beta$, the impulse response can be realized according to (13) by utilizing two feedback filters. In that case the output signal of a first feedback filter is subtracted from the input signal of the first low-pass filter, and the output signal of the second feedback filter is subtracted from the input signal of the second low-pass filter.

The impulse response of the first feedback filter is then to be equal to $\alpha\cdot\delta(k-1)$, and the impulse response of the second feedback filter is then to be equal to $\beta\cdot\delta(k-1)$.

If both the sub-predetection filters 10 and 40 and the feedback filters are arranged as digital filters, the values of $\alpha$ and $\beta$ and $\gamma$ can be set to a fixed value.

If the sub-predetection filters 10 and 40 are arranged as analog filters, it may be necessary to arrange the feedback filters as adaptive filters to be able to compensate for the inaccuracies of the values of $\alpha$ and $\beta$ in the analog sub-predetection filters 10 and 40. There is then assumed that the sub-predetection filter 10 has a relatively small time constant and that the sub-predetection filter 40 has a relatively large time constant.

For the adaptation of the feedback filter to the actual value of $\alpha$ and $\beta$, a difference signal e(k) is determined which represents a difference between a reconstructed detection signal and the actual detection signal. By means of the multiplier circuit 28 the correlation value between the symbol value â(k-1) and the difference signal e(k) is determined. This correlation value is equal to zero if the amplitude of the first feedback signal is correct. If the correlation value differs from zero, this error is integrated by the integrator 20, so that the amplitude of the first feedback signal is adapted in the right direction.

By means of the multiplier circuit 30 the correlation value between the symbol value â(k-4) and the difference signal e(k) is determined. This correlation value is equal to zero if the amplitude of the second feedback signal is correct. If the correlation value differs from zero, this error is integrated by the integrator 20, so that the amplitude of the first feedback signal is adapted in the right direction. Since the predetection filter 40 has a relatively large time constant, the contribution of the symbol â(k-4) to the difference signal e(k) will mainly be determined by the deviation of the amplitude of the second feedback signal. By determining the correlation value of the difference signal e(k) and the symbol value â(k) and adapting the amplitude of the second feedback signal with the aid of the integrator 34 in response to this correlation value, the correct value of the amplitude of the feedback signal is obtained without the first feedback signal disturbing the computation hereof. Neither has the second feedback signal any influence on the computation of the amplitude of the first feedback signal. A proviso for this is that the time constants of the two filters are sufficiently white apart. The control system formed by multiplier circuits 17 and 26, the subtracter circuit 18 and the integrator 24 provide that the average amplitude of the reconstructed detection signal continues to be equal to the average amplitude of the detection signal. This control circuit is identical with that of the receiver shown in FIG. 7.

In the receivers shown in FIGS. 7 and 8 the predetection filters are not arranged adaptively. Needless to observe that it is possible to arrange the predetection filters adaptively to adapt the receiver to the properties of the noise component and/or the transfer function of the channel. This adaptivity may be based, for example, on the LMS criterion or the so-termed zero forcing criterion. The implementation of this adaptivity is based on the difference signal e(k).

There is observed that the receiver can be implemented completely in hardware, but it is alternatively possible for the receiver to be realised wholly or in part in a signal processor. In that case the signal processor is controlled by suitable software.

We claim:

1. A digital signal receiver for recovering digital symbol values from a received digital signal representing said symbol values, comprising:

signal detecting means which includes (i) combining means having a first input for the received signal and a second input for a supplied feedback signal, and which is adapted to derive an intermediate signal which is a subtractive combination of the received signal and the feedback signal; and (ii) filter means coupled to an output of said combining means for filtering the intermediate signal to limit a noise bandwidth thereof, the filtered intermediate signal constituting a detection signal which is produced at an output of said signal detecting means; said detection signal having an intersymbol interference characteristic resulting from said filtering of the intermediate signal;

symbol detecting means coupled to the output of said signal detecting means to receive said detection signal and derive therefrom a symbol signal in the form of a series of signal pulses corresponding to digital symbol values represented by said detection signal, said symbol signal being produced at an output of said symbol detecting means, said output being an output of the digital signal receiver; and feedback means coupling the output of said symbol detecting means to the second input of said combining means for supplying said combining means with a feedback signal derived from said symbol signal as modified so that when filtered by said filter means the filtered feedback signal has an intersymbol interference characteristic which substantially matches the intersymbol interference characteristic of said received signal after filtering by said filter means;

whereby the detection signal supplied to said symbol detecting means is corrected to minimize intersymbol interference in the symbol signal produced by said symbol detecting means at the output of the digital signal receiver.

2. A receiver as claimed in claim 1, wherein said filter means is an analog low-pass filter.

3. A receiver as claimed in claim 1, wherein said filter means has a fixed transfer characteristic.

4. A receiver as claimed in claim 1, wherein said feedback means is an adaptive filter.

5. A digital signal receiver for recovering digital symbol values from a received digital signal representing said symbol values, comprising:

signal detecting means having two parallel circuit branches, each branch including (i) combining means having a first input for the received signal and a second input for a supplied feedback signal, and which is adapted to derive an intermediate signal which is a subtractive combination of the received signal and the feedback signal; (ii) multiplying means coupled to said combining means for multiplying the intermediate signal by a predetermined constant less than unity; and (iii) filter means coupled to said multiplying means for filtering the multiplied intermediate signal to limit a noise bandwidth thereof, the resulting filtered signal constituting a detection signal which is produced at an output of said filter means; said detection signal having an intersymbol interference characteristic resulting from said filtering of the multiplied intermediate signal;

further combining means coupled to the outputs of the filter means of both of said circuit branches for combining the detection signals produced by both of said filter means to form a combined detection signal;

symbol detecting means coupled to said further combining means to receive said combined detection signal and derive therefrom a symbol signal in the form of a series of signal pulses corresponding to digital signal values represented by said combined detection signal, said symbol signal being produced at an output of said symbol detecting means, said output being an output of the digital signal receiver; and first and second feedback means for respectively coupling the output of said symbol detecting means to the second input of the combining means in each of the two parallel circuit branches to supply the combining means in each branch with a respective feedback signal, the feedback signal in each branch corresponding to said symbol signal as modified so that the intersymbol interference characteristic of said feedback signal after filtering by said filter means in said branch substantially matches the intersymbol interference characteristic of said multiplied intermediate signal after filtering by said filter means in said branch;

whereby the combined detection signal supplied to said symbol detecting means is corrected to minimize intersymbol interference components in the symbol signal produced at the output of the digital signal receiver.

* * * * *